Figure 1:
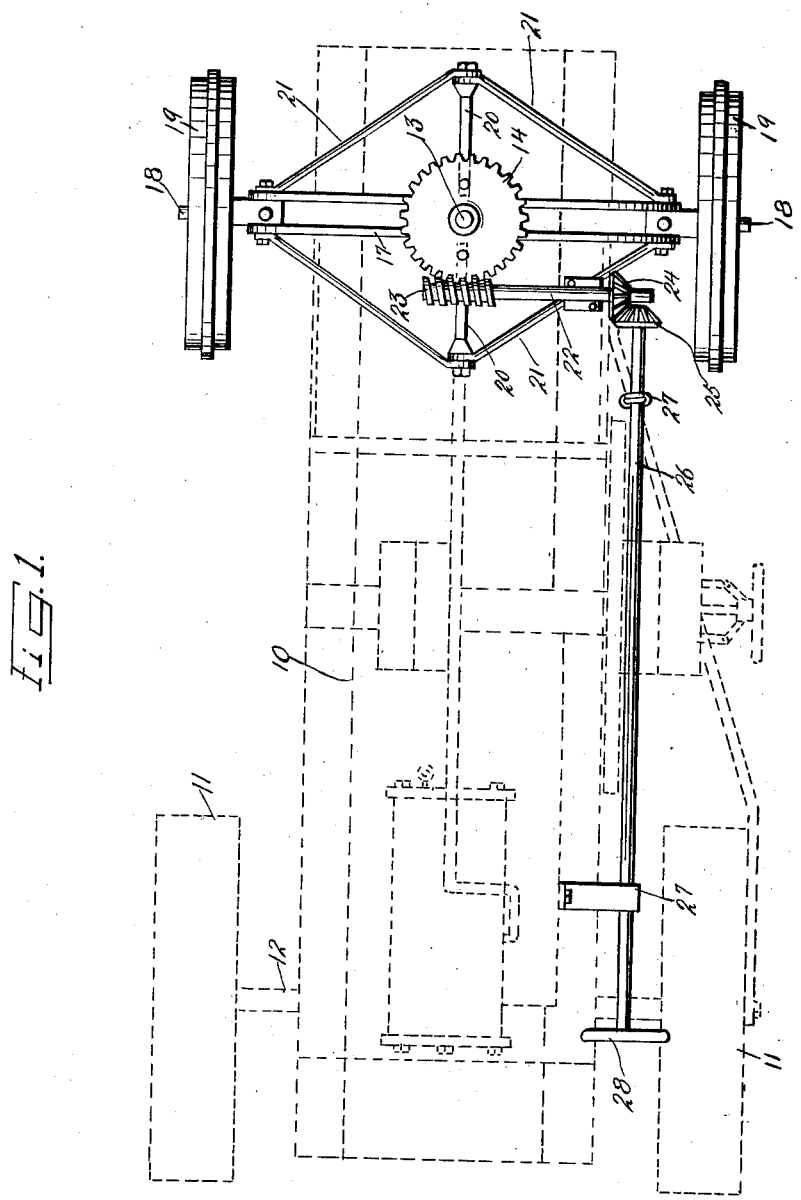

W. O. HANCOCK.
STEERING DEVICE.
APPLICATION FILED JAN. 26, 1911.

1,002,512.

Patented Sept. 5, 1911.
2 SHEETS—SHEET 1.

Witnesses
J. E. Strobel
L. N. Gillis

Inventor
W. O. Hancock.
By Chandler & Chandler
Attorneys

W. O. HANCOCK.
STEERING DEVICE.
APPLICATION FILED JAN. 26, 1911.
1,002,512.
Patented Sept. 5, 1911.
2 SHEETS—SHEET 2.
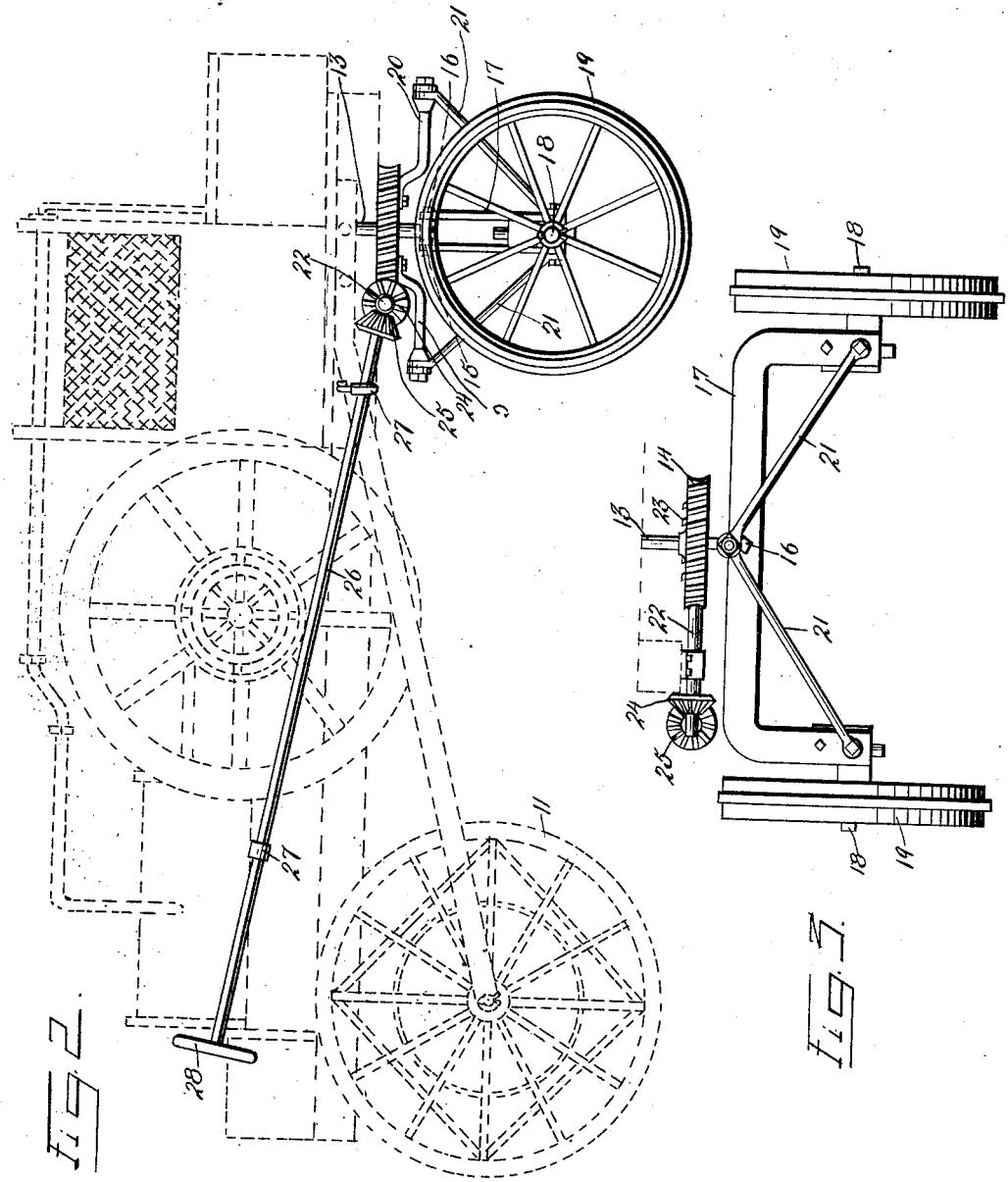
Witnesses
J. E. Strobel
L. N. Gillis
Inventor
W. O. Hancock.
By 
Attorneys.

UNITED STATES PATENT OFFICE.

WILLIAM O. HANCOCK, OF ORLEANS, INDIANA.

STEERING DEVICE.

1,002,512.  Specification of Letters Patent.  Patented Sept. 5, 1911.

Application filed January 26, 1911. Serial No. 604,799.

*To all whom it may concern:*

Be it known that I, WILLIAM O. HANCOCK, a citizen of the United States, residing at Orleans, in the county of Orange, State of Indiana, have invented certain new and useful Improvements in Steering Devices; and I do hereby declare the following to be a full, clear, and exact description of the invention, such as will enable other skilled in the art to which it appertains to make and use the same.

This invention relates to traction engines and has special reference to a steering device for engines of this character.

The principal object of the invention is to provide a new and improved means for steering an engine of this character having an arched steering axle.

A second object of the invention is to provide an improved steering device so arranged that the steering wheels may adjust themselves to inequalities of the ground without affecting the steering of the machine.

With the above and other objects in view as will be hereinafter apparent the invention consists in general of certain novel details of construction and combinations of parts hereinafter fully described, illustrated in the accompanying drawings, and specifically set forth in the claims.

In the accompanying drawings, like characters of reference indicate like parts in the several views, and; Figure 1 is a plan view of an engine equipped with this invention, the engine being shown in dotted lines and the invention in full lines. Fig. 2 is a side elevation illustrating the parts in a manner similar to Fig. 1. Fig. 3 is a detail end view of the invention removed from the traction engine.

The engine is of any preferred type and in the present instance there is shown an engine 10 having rear wheels 11 carried on a stationary axle 12. The forward wheels of this engine are used for the steering wheels.

The invention proper includes a vertically disposed shaft 13 which is journaled adjacent the forward end of the frame of the engine 10 and this shaft 13 extends downward below the frame of the engine, being there provided with a worm wheel or gear 14 securely fixed upon said shaft 13 adjacent its lower end but spaced slightly therefrom. The lower end of the axle 12 is provided with a sleeve 15 wherethrough passes a bolt 16 on which is pivoted an arch axle 17. This arch axle is pivoted centrally of the bight portion and the extremities of its legs are provided with journals 18 whereon are mounted steering wheels 19, the latter being freely rotatable with reference to said journals.

The construction of the device is such that the axle 17 extends diametrically beneath the wheel 14 and at right angles to the vertical plane of this axle are diametrically disposed arms 20 each of which has its inner end fixed to the under side of said wheel 14 and its outer end projecting outwardly from beneath said wheel. On the outer end of each of the arms 20 are pivoted the respective ends of links 21, the remaining ends of said links being pivoted to the lower ends of respective legs of the axle 17. It is to be observed that the pivot 16 is nearly in alinement with the extremities of the arms 20 so that the axle 17 is free to rotate about said pivot 16 in a vertical plane, the movement being permitted by the natural lost motion in the several pivot joints of the axle and links.

Extending transversely across the machine is a shaft 22 whereon is a worm 23 which meshes with the worm wheel 13. This shaft 22 has also fixed thereon a beveled gear 24 which meshes with a similar beveled gear 25 carried on a shaft 26 which extends rearwardly from the shaft 22 and terminates at a suitable point adjacent the station of the operator when the machine is being driven. This shaft 26 is supported in suitable bearings 27 fixed to the machine and is provided with a hand wheel 28 by means of which the shaft 26 may be rotated.

In the operation of the device the rotation of the hand wheel 28 will rotate the shaft 22 through the medium of the gears 24 and 25. Rotation of the shaft 22 rotates the gear 14 this moves the axle 17 to steer the machine to the right or left, the links 21 aiding greatly in this action and assisting to prevent the axle from straining the pivot bolt 16 to too great an extent.

In going over rough ground it will be obvious that either of the wheels 19 may rise or fall to a slight extent and this without affecting the steering as the shaft 13 remains constantly vertical with respect to the frame of the traction engine.

There has thus been provided a simple and efficient device of the kind described and for the purpose specified.

It is obvious that many minor changes may be made in the form and construction of this invention without departing from the material principles thereof. It is not therefore desired to confine the invention to the exact form herein shown and described but it is wished to include all such as come within the scope of the appended claims.

Having thus described the invention what is claimed as new, is:

1. In a steering gear for traction engines, a frame, a vertical shaft journaled adjacent one end of said frame, a gear carried on said shaft adjacent the lower end thereof, an arch axle having journals at the extremities of its legs and carried at the lower end of said shaft, said axle extending diametrically beneath said gear, diametrically disposed arms secured to and projecting from beneath said gear, said arms being disposed at right angles to direction in which the axle extends, links connecting the outer extremity of each arm with the lower ends of said legs, and means on said frame to rotate said gear.

2. In a steering gear for traction engines, a frame, a vertical shaft journaled adjacent one end of said frame, a gear fixed on said shaft adjacent the lower end thereof, an arch axle pivoted to the lower end of said shaft to swing in a vertical plane, said axle extending diametrically beneath said gear, diametrically disposed arms fixed to and projecting from beneath said gear, said arms lying in a plane at right angles to the axle, links each having one end pivoted to the extremity of a respective arm and the other end pivoted to the lower end of a respective leg of said axle, and means on said frame to rotate said gear.

In testimony whereof, I affix my signature, in presence of two witnesses.

WILLIAM O. HANCOCK.

Witnesses:
JAMES F. SHEPHERD,
THOMAS J. SHEPHERD.

---

Copies of this patent may be obtained for five cents each, by addressing the "Commissioner of Patents, Washington, D. C."